July 26, 1966 D. F. MEENAN 3,262,492
APPARATUS FOR MAINTAINING A LIQUID AT
A CONSTANT LOW TEMPERATURE
Filed June 15, 1964 3 Sheets-Sheet 2

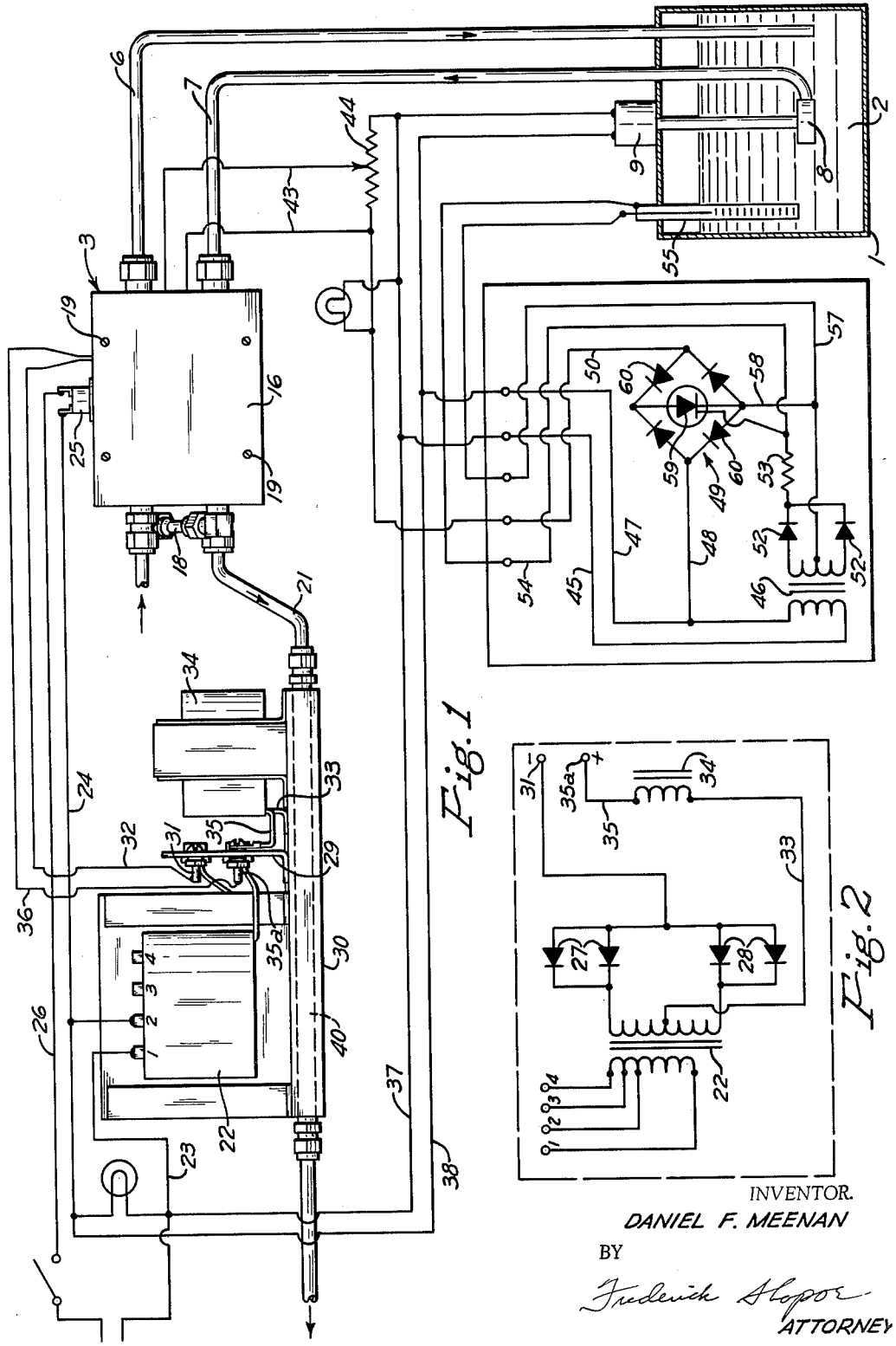

INVENTOR.
DANIEL F. MEENAN
BY
Frederick Slopor
ATTORNEY.

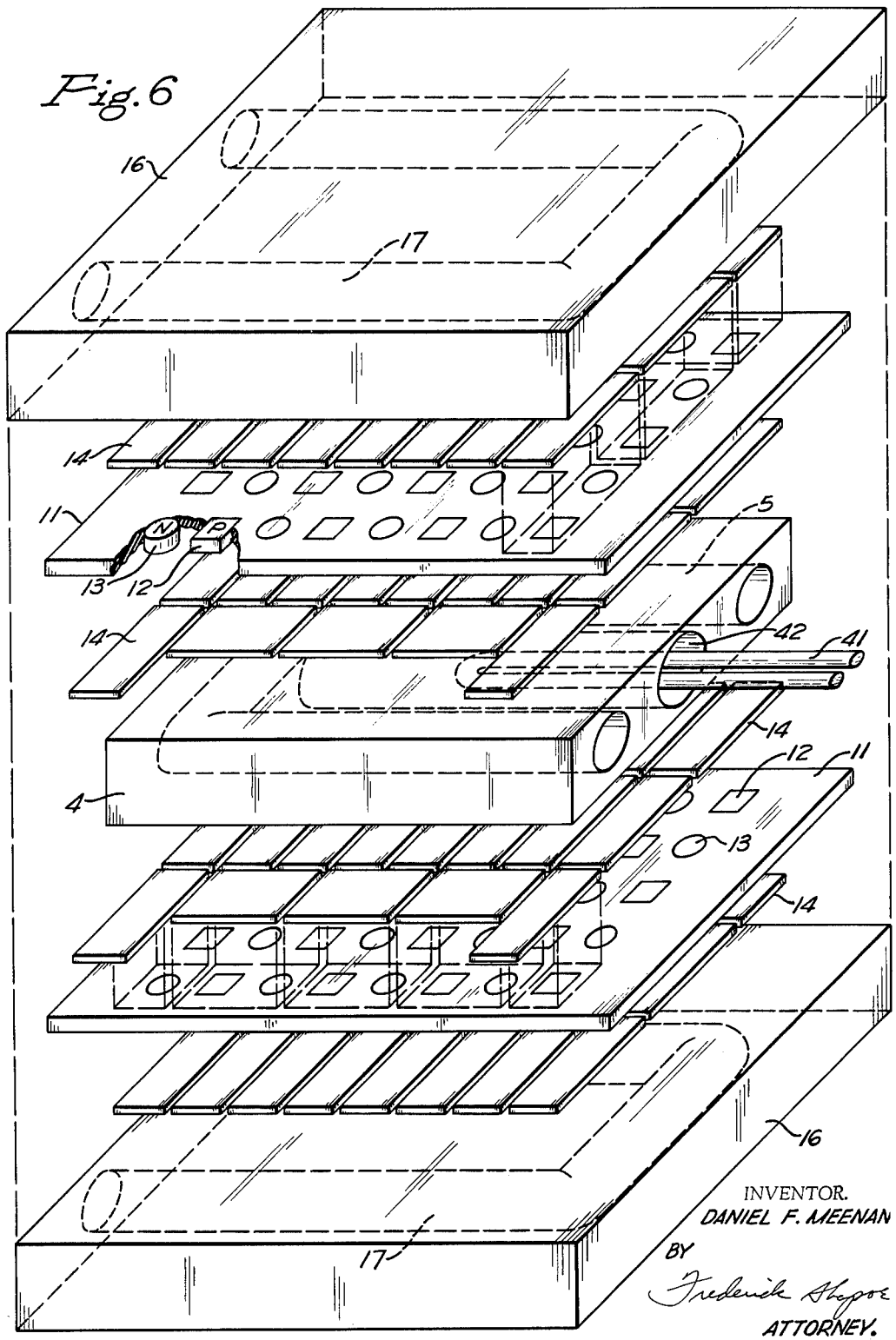

United States Patent Office 3,262,492
Patented July 26, 1966

3,262,492
APPARATUS FOR MAINTAINING A LIQUID AT A CONSTANT LOW TEMPERATURE
Daniel F. Meenan, Pittsburgh, Pa., assignor to Westinghouse Electric Corporation, Pittsburgh, Pa., a corporation of Pennsylvania
Filed June 15, 1964, Ser. No. 374,935
10 Claims. (Cl. 165—27)

This invention relates to low temperature producing apparatus, but more particularly to such apparatus employing thermoelectric cooling.

In the chemical and bio-chemical industries it often is necessary to maintain constant temperatures below ambient temperatures. At present this is done principally either by refrigerated baths employing compressors or Dry Ice or water ice. Compressor systems are large and bulky and become quite complex when fine temperature control is required. The complexity is necessary because of the response time of a compressor system and also because of its overshoot. The overshoot is caused by the fact that most compressors have too much capacity at temperatures slightly under ambient. Dry Ice and water ice are undesirable because the systems using them have to be continually replenished and the temperatures that they create are not easily adjusted.

It is among the objects of this invention to provide apparatus for producing low temperatures in liquid, in which the operation of the apparatus is silent, in which there are no moving parts, in which there are no refrigerants, which is relatively simple in construction, which is easily adjusted for different temperatures, which is very reliable and requires a minimum of maintenance, and which maintains a substantially constant low temperature.

In accordance with this invention, in a heat exchanger a cooling member is provided with a passage for circulation therethrough of the liquid or bath being cooled. A heat sink member in the heat exchanger is spaced from the cooling member and is provided with a passage for circulation of cooling water. Disposed between these two members is a thermoelectric cooling device. Means are provided for electrically energizing the cooling device to cause it to transfer heat from the cooling member to the heat sink member. Associated with the cooling member is a normally inactive electric heater which is turned on, when the temperature of the liquid starts to fall below a predetermined minimum, by a thermostat responsive to the temperature of the liquid. The thermostat turns off the heater as soon as the temperature of the liquid starts to exceed said minimum.

The preferred embodiment of the invention is illustrated in the accompanying drawings, in which FIG. 1 is a view that is partly a side elevation and partly diagrammatic;

FIG. 2 is an electrical diagram of the power supply for the heat exchanger;

FIG. 6 is a further enlarged and exploded view of the principal parts of the heat exchanger.

Figure 3:
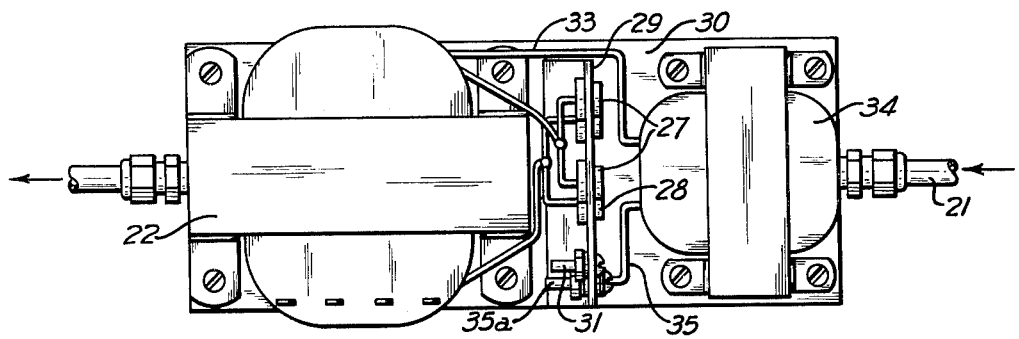
FIG. 3 is an enlarged plan view of the apparatus in FIG. 2.
Figure 4:
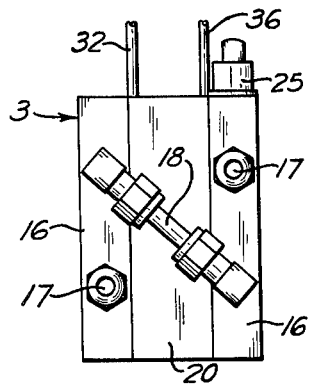
FIG. 4 is an enlarged view of the left-hand end of the heat exchanger shown in FIG. 1.
Figure 5:
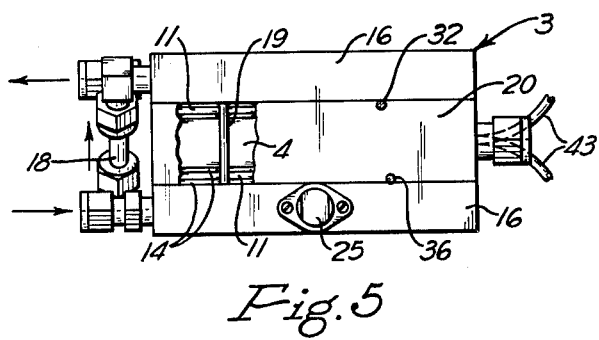
FIG. 5 is a plan view, partly broken away, of the heat exchanger.

Referring to the drawings, a container or tank 1, preferably insulated, contains a liquid bath 2 having a freezing point below —20° C. In order to maintain this bath at a predetermined low temperature, it is circulated through a heat exchanger 3. As shown in FIGS. 5 and 6, the heat exchanger includes a central cooling member in the form of a metal plate 4 provided with a fluid passage 5, preferably U-shape. One end of this passage is connected by an outlet pipe 6 to the inside of the tank, while the opposite end of the passage is connected by an inlet pipe 7 to a pump 8 in the tank. The pump is driven by an electric motor 9. Consequently, the bath is circulated by the pump through the cooling plate 4 and back to the tank.

The cooling plate is cooled by one or more thermoelectric cooling devices, preferably two of them electrically connected in a series and engaging its opposite sides. Such devices, in themselves, are well known. Each one is formed from an insulating positioning sheet 11 provided with a large number of openings, in each of which a bismuth telluride pellet or the like is mounted. Half of the pellets are P pellets 12 and the other half are N pellets 13. The ends of these pellets are secured to copper straps 14 on opposite sides of the sheet. The straps are so arranged that electric current will flow from a terminal strap through a P pellet, for example, then through a strap at the opposite side of the sheet to an N pellet, through that pellet and a strap adjacent the terminal strap to the next P pellet, and so on back and forth through and along the sheet until the terminal strap at the final N pellet is reached. The electric current flowing through the straps and pellets causes in a well-known manner the thermoelectric cooling device to extract heat from cooling plate 4 and transfer it to a heat sink member 16 engaging the opposite side of the device. Each heat sink member likewise is a metal plate provided with a passage 17 through it. If the passage is U-shape, it is best to position its ends at the end of the heat exchanger opposite to the ends of the cooling plate passage. The passages in the heat sink plates preferably are connected in series, such as by a short pipe 18.

The cooling plate and heat sink plates are electrically insulated from the thermoelectric cooling devices. Where the plates are made of aluminum, insulating them can be accomplished by anodizing the metal. On the other hand, heat conduction between the thermoelectric cooling devices and the plates, between which these devices are sandwiched, is improved by covering with a conducting grease the plate surfaces that engage the cooling devices. The assembly is joined together by bolts 19 extending through the heat sink plates, which are outermost, and across the edges of the smaller cooling plate and cooling devices. Those edges may be surrounded by thermal insulation held in place by a metal casing 20.

Generally, the simplest way to remove from the heat sink plates the heat that they receive from the cooling plate is to connect the inlet end of the passage 17 in one of them to the city water supply and also connect a discharge pipe 21 to the outlet of the passage in the other heat sink plate. As the outlet of the first heat sink plate and the inlet of the second plate are connected by short pipe 18, the cooling water flows through the connected heat sink plates in succession and carries heat away from them.

Electric current for operating the thermoelectric cooling devices is supplied through a transformer 22. Alternating current is delivered through a wire 23 to one terminal of the primary of the transformer, the other terminal being connected by wire 24, an overheat thermostat 25 on the heat exchanger and a wire 26 to the source of current. The end terminals of the secondary are connected to diodes that rectify the current. Thus, as shown in FIG. 2, each end of the secondary preferably is electrically connected to two diodes 27 or 28 in parallel, which are pressed into openings in a metal bracket 29 mounted on a heavy base plate 30. A terminal 31, also mounted on the bracket in electrical contact with it and therefore connected with the diodes, is connected by a wire 32 to the thermoelectric cooling devices. A center tap on the secondary of the transformer is connected by a wire 33 to a choke 34, which in turn is connected by a wire 35 to a second terminal 35a mounted on the bracket but insulated from it. This second terminal is connected by a wire 36 to the other end of the thermoelectric devices. Wires 23 and 24 are connected, respectively, by wires 37 and 38 with pump motor 9.

The transformer and choke also are mounted on base plate 30, which is provided with a passage 40 through it that is connected at its inlet end to discharge pipe 21 of the heat sink plates. Consequently, the water leaving the heat sink plates flows through the base plate and maintains the transformer, choke and diodes relatively cool.

The heat exchanger is designed to cool the bath 2 to a predetermined low temperature below the lowest temperature desired. The minimum low temperature may be, for example, −20° C. The operating temperature of the bath, however, will be somewhat higher. In order to raise the temperature to the desired operating point, the cooling plate in the heat exchanger is provided with an electric heater that is under the control of a thermostat in the bath. Thus, the thermoelectric devices tend to cool the bath to a predetermined minimum temperature, but the electric heater brings the temperature up to the desired point and maintains it there. As shown in FIG. 6, the heater 41 preferably is mounted in a passage 42 in cooling plate 4 between the two sides of the fluid passage therein. A resistance type electric heater may be used, preferably of about 240 watts. The wires 43 from the heater are connected to a powerstat 44, as shown in FIG. 1, for varying the wattage of the heater. One terminal of the powerstat is connected directly with the A.C. power supply through wire 37, which also is connected by wire 45 with one end of the primary of a transformer 46. The other end of the primary is connected to the A.C. supply by wires 47 and 38 and by a wire 48 to a switching device 49, preferably a Westinghouse Trinistor because of its quietness, which is connected to the other terminal of the powerstat 44 by a wire 50.

The secondary of transformer 46 is connected at its ends to diodes 52 that are connected through a resistor 53 to the central diode of the Trinistor switching device and by a wire 54 to one terminal of the thermostat 55 in the bath 2. It is preferred to use an adjustable mercury thermostat. The secondary of the transformer has a center tap that is connected by a wire 57 to the other terminal of the thermostat. This wire and a wire 58 also connect the center tap to the center diode 59 of the switching device and to the surrounding diodes 60.

When the temperature of the bath starts to rise above the temperature that is to be maintained, the thermostat 55 closes and shorts out the switching device 49, which thereupon opens the circuit to the electric heater 41 so that the heat exchanger will start to reduce the temperature of the bath. The moment the thermostat opens when the temperature of the bath starts to fall, device 49 closes the heater circuit to keep the bath from falling below the desired temperature.

Figure 7:
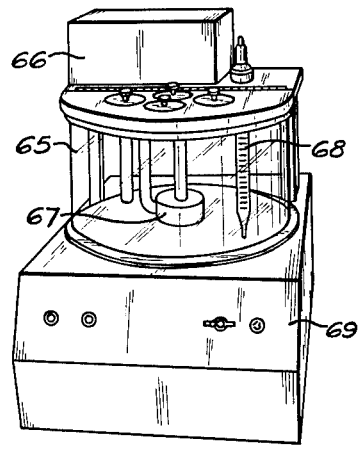
FIG. 7 is a perspective view of a commercial unit embodying this invention.

This control permits the temperature of the bath to be maintained substantially constant. For example, as shown in FIG. 7, apparatus has been built with such a system which includes a 4½ gallon capacity Dewar flask 65 forming the tank, two water cooled 40 ampere-2 volt thermoelectric modules and an electric resistance heater in the heat exchanger 66 on top of the flask, a circulating pump 67 and a mercury thermoregulator 68 in the flask, and a solid state relay, transformers, choke, diodes etc. in the base 69 of the apparatus. The bath was operated at controlled temperatures at various points between −20° C. and +40° C. and was controlled within ±.02° C. This unit compares favorably in both cost and performance with compressor models that are now marketed. It can be used for such physical measurements as viscosity, density, vapor pressure and resistivity. It also is useful for chemical kinetic studies and environmental studies.

Instead of circulating a cooling bath through the heat exchanger, this apparatus can be used as a circulating cooler by, in effect, connecting the two ends of the pipes in the bath together so that the liquid in the cooling circuit flows in a closed circuit. Of course, a pump is used to keep the liquid circulating through the heat exchanger. Such apparatus can be used to circulate coolant to refractometers, polarimeters and other laboratory equipment where fine temperature control is required.

I claim:
1. Apparatus for maintaining a liquid at a constant low temperature, comprising a cooling member provided with a passage for circulation therethrough of the liquid being cooled, means for causing the circulation therethrough of the liquid being cooled, a heat sink member spaced from the cooling member and provided with a passage for circulation therethrough of cooling water, means for causing the circulation therethrough of the cooling water, a thermoelectric cooling device disposed between said members in engagement therewith, means for electrically energizing said cooling device to cause it to transfer heat from said cooling member to the heat sink member, a normally inactive electric heater associated with the cooling member, and a thermostat responsive to the temperature of said liquid for turning the heater on when the temperature of the liquid starts to fall below a predetermined minimum, said thermostat being adapted to turn off the heater as soon as the temperature of the liquid starts to exceed said minimum.

2. Apparatus according to claim 1, in which said cooling member is a metal plate and said passage therein is substantially U-shape, said plate being provided between the sides of the U-shape passage with a bore containing said electric heater.

3. Apparatus according to claim 1, in which there are two of said thermoelectric cooling devices and two of said heat sink members, the cooling member being disposed between said cooling devices and the latter being disposed between the heat sink members.

4. Apparatus according to claim 1, including manually adjustable means for varying the wattage of said heater.

5. Apparatus according to claim 1, in which said electric energizing means includes an electric circuit provided with a transformer and a choke mounted on a base member having a passage through it, a conduit being provided for connecting the outlet of said heat sink passage with the inlet of said base member passage.

6. Apparatus according to claim 5, including diodes in said circuit between said transformer and thermoelectric cooling device, and a metal support for the diodes in engagement therewith and said base member.

7. Apparatus for maintaining a liquid at a constant low temperature, comprising a container for said liquid, a cooling member provided with a passage therethrough, conduits connecting the ends of said passage with the inside of said container, a pump in the container for circulating liquid therein through said conduits and passage, a heat sink member spaced from the cooling member and provided with a passage for circulation therethrough of cooling water, means for circulating the cooling water therethrough, a thermoelectric cooling device disposed between said members in engagement therewith, means for electrically energizing said cooling device to cause it to transfer heat from said cooling member to the heat sink member, a normally inactive electric heater associated with the cooling member, and a thermostat responsive to the temperature of said liquid for turning the heater on when the temperature of the liquid starts to fall below a predetermined minimum, said thermostat being adapted to turn off the heater as soon as the temperature of the liquid starts to exceed said minimum.

8. Apparatus for maintaining a liquid at a constant low temperature, comprising a cooling member provided with a passage for circulation therethrough of the liquid being cooled, means for causing the circulation therethrough of the liquid being cooled, a heat sink member spaced from the cooling member and provided with a passage for circulation therethrough of cooling water, means for causing the circulation therethrough of the cooling water, a thermoelectric cooling device disposed between said members in engagement therewith, means for electrically energizing said cooling device to cause it to transfer heat from said cooling member to the heat sink member, an electric heater associated with the cooling member, an electric circuit for energizing the heater, a normally open switch in said circuit, a normally closed thermostat responsive to the temperature of said liquid, and an electric circuit connecting the thermostat with the switch for maintaining the switch open as long at the thermostat is closed and for closing the switch when the thermostat is opened by a drop in the temperature of said liquid below a predetermined minimum.

9. Apparatus according to claim 8, in which said switch is an electronic switching device containing a plurality of diodes, and said circuit includes a transformer electrically connected with said device and said thermostat.

10. A constant temperature bath maintainable close to a selected temperature comprising, in combination, a tank containing a liquid comprising said bath, means for circulating the liquid to and from the tank to a heat exchanger, the heat exchanger comprising a cooling member and thermoelectric means for withdrawing heat from the cooling member whereby to cool the circulated liquid to at least the selected temperature or lower, heating means associated with the circulating liquid, and control means for energizing the heating means whenever the circulating liquid is brought to a temperature below the selected temperature whereby to heat the circulating liquid close to the selected temperature whereby the bath is maintained at said selected temperature.

References Cited by the Examiner
UNITED STATES PATENTS

| | | | |
|---|---|---|---|
| 3,057,340 | 10/1962 | Fritts | 62—3 |
| 3,111,813 | 11/1963 | Blumentritt | 62—3 |
| 3,155,157 | 11/1964 | Anderson et al. | 165—30 |

ROBERT A. O'LEARY, *Primary Examiner.*

M. A. ANTONAKAS, *Assistant Examiner.*